United States Patent [19]

Bliss et al.

[11] Patent Number: 5,760,770

[45] Date of Patent: Jun. 2, 1998

[54] SYSTEM AND METHOD FOR DEFINING A VIEW TO DISPLAY DATA

[75] Inventors: William J. Bliss, Medina; Matthew F. Hillman, Seattle, both of Wash.

[73] Assignee: Microsoft Corporation, Redmond, Wash.

[21] Appl. No.: 649,965

[22] Filed: May 15, 1996

[51] Int. Cl.⁶ ........................................ G06F 15/00
[52] U.S. Cl. .................. 345/335; 345/340; 345/346; 395/757
[58] Field of Search ........................ 345/334, 335, 345/339, 340, 342, 343, 346, 348, 355, 357; 395/757, 764, 765, 601, 602, 603, 607, 608

*Primary Examiner*—Matthew M. Kim
*Assistant Examiner*—Ba Huynh

*Attorney, Agent, or Firm*—Jones & Askew, LLP

[57] ABSTRACT

Views and view controls are used to display and access data created from multiple applications. Namespaces, folders, items, views and view control objects are used to abstract the data type of the data, contained in items. Therefore, data can be displayed in multiple views and the same view can be used to display data independent of the data type. To display a view, a user selects a folder that contains items. A folder, item, view, and view control work together to define the fields and data to display and the format to display them. The user can generate many views by editing one view, thereby creating a new view. An edit interface is provided allowing the user to modify a view. Modifications include entering new data in a view, defining new fields, and entering calculations based on other data. A new view control can be installed by determining what information to pass, conforming to OLE standards and entering the view control in the operating system's database registry.

18 Claims, 9 Drawing Sheets

Sonics '95-'96 Schedule

December 1995

| Opponent | Division | Game Date | Where | Start | Sonics Score | Opponent Score |
|---|---|---|---|---|---|---|
| Result: Won | | | | | | |
| LA Lakers | Pacific | Sat 04/11/95 | Home | 7:00PM | 103 | 89 |
| LA Clippers | Pacific | Tue 07/11/95 | Home | 7:00PM | 127 | 108 |
| Denver Nuggets | Midwest | Wed 08/11/95 | Road | 6:00PM | 122 | 117 |
| Vancouver Grizzlies | Pacific | Sat 11/11/95 | Home | 7:00PM | 117 | 81 |
| Philadelphia 76ers | Atlantic | Tue 14/11/95 | Road | 4:30PM | 115 | 107 |
| Charlotte Hornets | Central | Fri 17/11/95 | Road | 4:30PM | 98 | 96 |
| Minnesota Timberwolves | Midwest | Wed 22/11/95 | Home | 5:00PM | 106 | 97 |
| San Antonio Spurs | Midwest | Fri 24/11/95 | Home | 7:00PM | 112 | 100 |
| Chicago Bulls | Central | Sun 26/11/95 | Home | 5:00PM | 97 | 92 |
| Milwaukee Bucks | Central | Fri 01/12/95 | Home | 7:00PM | 110 | 99 |
| Result: Lost | | | | | | |
| Utah Jazz | Midwest | Fri 03/11/95 | Road | 6:00PM | 94 | 112 |
| LA Lakers | Pacific | Fri 10/11/95 | Road | 7:30PM | 97 | 100 |

Filter Applied | 45 Items

SYSTEM AND METHOD FOR DEFINING A VIEW TO DISPLAY DATA

TECHNICAL FIELD

This invention relates to a system and method for defining a view in a display. More particularly, this invention relates to a system and method for defining a view that displays data independent of the application which created the data and the data type.

BACKGROUND OF THE INVENTION

Modern computers and the applications that run on these computers are capable of generating enormous amounts of data to display to the user. So much information is generated that users may sometimes be overwhelmed by the amount of data they must interpret. In order to address the needs of users to interpret large amounts of data, the data should be presented in a meaningful manner so that it can be more easily assessed and the correct information can be extracted from it. Furthermore, the same data may need to be presented in different ways depending on how the user wants to use the data at any given time. This requires flexibility in presentation and the ability to support the manipulation of this data in different ways depending on the requirements that the user has at the time.

The concept of a view addresses the need to display data in a meaningful fashion. A view is method or format by which data is displayed. The view will use values in specific fields of the data to display it in a particular format. For example, a calendar view may display a format looking much like a monthly calendar with appointments and events displayed on the days of the calendar format. A database containing addresses may be displayed in the familiar format of an address card much like those on the common rotary address card holder. Conventional applications employ pre-defined, uneditable views. Data is consistently shown using the same view for the application. Moreover, these views cannot be used across different types of data or with different applications.

Some conventional applications possess the ability to display data in different ways. For example, a word processing document could be displayed using a normal view, a page layout view, or an outline view. These views display the same data in different formats which convey different meanings. The page layout shows the document as it would look if printed, whereas the outline view displays the organization of the document. Although presenting different views, the word processing application still only provides pre-defined views so the user is given very little flexibility in how the data is to be displayed.

Other conventional applications give the user the ability to modify the different views within the application. Users could sort and filter data to create different ways of viewing the same data. In these applications the views and the data are closely linked together. Therefore, the view can not display any other type of data other than the type of data for which the view was designed. For example, in an application having a table view for e-mail messages, the user has some flexibility on how to present the e-mail messages within this defined view. The view, however, could not be used on any other data.

Other conventional applications have abstracted data type from the view, but those applications cannot use the same data for several different views. In such conventional applications, the view takes over control of the system and actually operates as an application under the current application rather than as part of the current application.

Therefore, there is a need for a system and method to define views independent of the data type that will not take over control of the system. This system and method will allow data to be used by several views and allow the user to manipulate this data and display it using the view most meaningful to the user.

SUMMARY OF THE PRESENT INVENTION

The present invention satisfies the need to present data with different views to enhance user interpretation of the data. In order to achieve that goal, the present invention provides a system and method of presenting a view to the user wherein the data is not specifically defined to the view. This view can be used with different data types, and a user can modify the view by changing and manipulating the data presented in the view. In addition, the system and method of displaying a view will not take control of the system, i.e., control will remain with the calling application. Further, the present invention provides a system and method for display of data from applications in a personal information manager. The present invention is also useful for any other application which interacts with information from other applications.

In general, the present invention creates a display using data developed from one or more applications. Particularly, the present invention constitutes a view displaying program module for a conventional computer system. The view displaying program module defines a data structure in memory constituting one or more namespaces, and the view displaying program module includes a view control to control, generate, and edit views, which comprise data generated by one or more other programs.

Each namespace stores one or more folders. Each folder stores a list of fields, one or more views associated with the folder, and one or more items. Each item stores one or more fields. Fields contain either operands or instructions.

In order to display a view with data from another application, the view displaying program module first selects a folder in a namespace in response to an input from an input device. The view displaying program module next selects one of the views associated with the folder, an item in the selected folder, and a field containing information to be displayed from the list of fields stored in the selected folder. The view is provided with the selected field and the information contained within the field in the selected item. The information in the selected field may contain computer instructions or an operand. The view is then displayed on the display device.

In another aspect of the invention, the view displaying program module provides a method to edit the view. Upon receiving a command from the input device to edit the view, the view displaying program module determines whether the view settings or displayed data is to be edited. If view settings are to be edited, an edit interface is loaded, and the view settings are edited in accordance with the input commands. If displayed data is to be edited, the view displaying program module determines whether the data can be edited. If the data cannot be edited, no action is taken on the data. If the data can be edited, then an edit interface is loaded. The items containing the data selected by the input device are edited in accordance with the input commands. This aspect of the invention includes the ability to add fields to a view in addition to modifying the existing ones. Once the editing is completed, the changes are stored and the display is updated with the edited view.

In yet another aspect of the invention, the view displaying program module provides a method of installing additional view controls. This method comprises determining what information is to be shared between the new view control and view displaying program module. Then interfaces that conform to the information passing standards used by the view displaying program module are created in the new view control. And finally, the new view control is defined for the view displaying program module.

BRIEF DESCRIPTION OF THE DRAWINGS

FIG. 11a and 11b are examples of screen formats depicting view types in the preferred embodiment.

DETAILED DESCRIPTION OF THE EMBODIMENT

Figure 1:
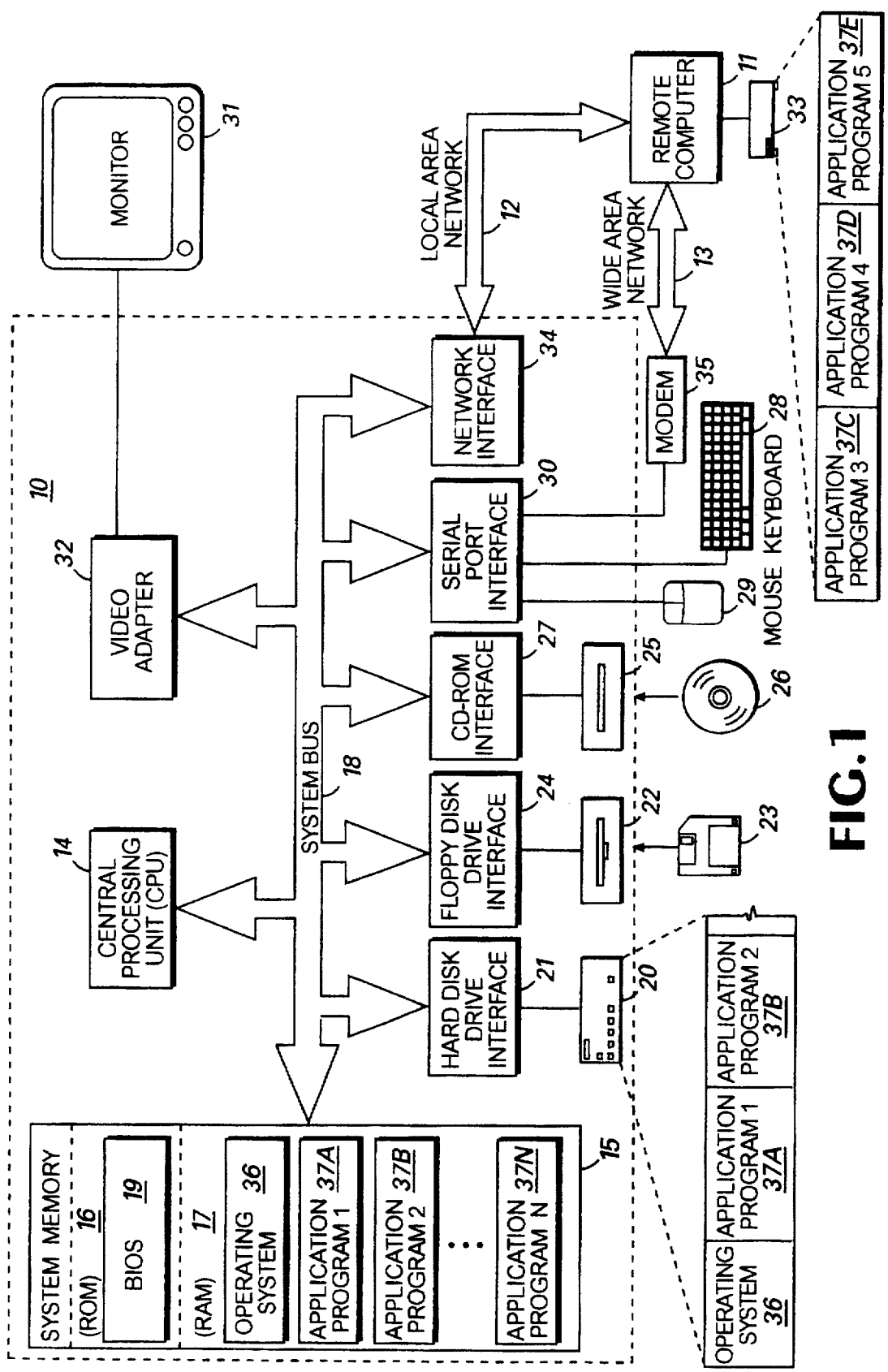
FIG. 1 is a block diagram of a personal computer suitable for use in implementing the present invention.

The present invention is directed to a system and method for defining a view to display data. The preferred embodiment of the present invention is represented by a view displaying program module called "Views" for use in a personal information manager application, such as the personal information manager application called "OUTLOOK," which is marketed by Microsoft Corporation of Redmond, Wash.

A personal information manager is an application that provides an organizational tool to the user. The personal information manager can interface with several applications that provide scheduling, electronic mail, task management "to-do" lists, and contact management. Briefly described, the preferred embodiment of the personal information manager includes a view displaying program module which allows the user to view data created from these different applications in the same display. The preferred embodiment of the view displaying program module also allows the user to modify this data for display and leaves the data available to be used with other viewing programs which can display the data. The preferred view displaying program module does not seize control of the system as if it were an application running under another application. Rather, the preferred view displaying program module creates its display while the program information manager retains control.

The applications that interface to the program manager support the structure defined in the preferred view displaying program module. In other words, these other applications will store the data they generate as items within the architecture of the preferred view displaying program module described herein.

Although the preferred embodiment will be generally described in the context of a view displaying program module of a personal information manager application and an operating system running on a personal computer, those skilled in the art will recognize that the present invention also can be implemented in conjunction with other program modules for other types of computers. Furthermore, those skilled in the art will recognize that the present invention may be implemented in a stand-alone or in a distributed computing environment. In a distributed computing environment, program modules may be physically located in different local and remote memory storage devices. Execution of the program modules may occur locally in a stand-alone manner or remotely in a client/server manner. Examples of such distributed computing environments include local area networks of an office, enterprise-wide computer networks, and the global Internet.

The detailed description which follows is represented largely in terms of processes and symbolic representations of operations by conventional computer components, including a central processing unit (CPU), memory storage devices for the CPU, connected display devices, and input devices. Furthermore, these processes and operations may utilize conventional computer components in a heterogeneous distributed computing environment, including remote file servers, remote computer servers, and remote memory storage devices. Each of these conventional distributed computing components is accessible by the CPU via a communication network. Those skilled in the art will recognize that such a communications network may be a local area network or may be a geographically dispersed wide area network, such as an enterprise-wide computer network or the global Internet.

The processes and operations performed by the computer include the manipulation of signals by a CPU or remote server and the maintenance of these signals within data structures resident in one or more of the local or remote memory storage devices. Such data structures impose a physical organization upon the collection of data stored within a memory storage device and represent specific electrical or magnetic elements. These symbolic representations are the means used by those skilled in the art of computer programming and computer construction to most effectively convey teachings and discoveries to others skilled in the art.

For the purposes of this discussion, a process is generally conceived to be a sequence of computer-executed steps leading to a desired result. These steps generally require physical manipulations of physical quantities. Usually, though not necessarily, these quantities take the form of electrical, magnetic, or optical signals capable of being stored, transferred, combined, compared, or otherwise manipulated. It is conventional for those skilled in the art to refer to these signals as bits, bytes, words, values, elements, symbols, characters, numbers, points, records, entries, objects, images, files, or the like. It should be kept in mind, however, that these and similar terms should be associated with appropriate physical quantities for computer operations, and that these terms are merely conventional labels applied to physical quantities that exist within and during operation of the computer.

It should also be understood that manipulations within the computer are often referred to in terms such as adding, comparing, moving, filtering, parsing, placing, altering, etc. which are often associated with manual operations performed by a human operator. The operations described herein are machine operations performed in conjunction with various input provided by a human operator or user that interacts with the computer.

In addition, it should be understood that the programs, processes, methods, etc. described herein are not related or limited to any particular computer or apparatus, nor are they related or limited to any particular communication network architecture. Rather, various types of general purpose machines may be used with program modules constructed in accordance with the teachings described herein. Similarly, it may prove advantageous to construct a specialized apparatus to perform the method steps described herein by way of dedicated computer systems in a specific network architecture with hard-wired logic or programs stored in nonvolatile memory, such as read only memory.

Referring now to the drawings, in which like numerals represent like elements throughout the several figures, aspects of the present invention and the preferred operating environment will be described.

The Operating Environment

Figure 2:
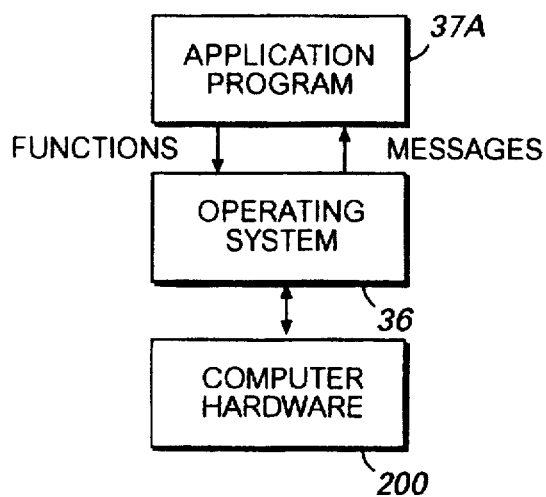
FIG. 2 is a flow diagram showing the interaction between an application program and the computer hardware.

FIGS. 1 and 2 illustrate various aspects of the preferred computing environment in which the present invention is designed to operate. Those skilled in the art will immediately appreciate that FIGS. 1 and 2 and the associated discussion are intended to provide a brief, general description of the preferred computer hardware and program modules, and that additional information is readily available in the appropriate programming manuals, user's guides, and similar publications.

FIG. 1 illustrates a conventional personal computer 10 suitable for supporting the operation of the preferred embodiment of the present invention. As shown in FIG. 1, the personal computer 10 operates in a networked environment with logical connections to a remote computer 11. The logical connections between the personal computer 10 and the remote computer 11 are represented by a local area network 12 and a wide area network 13. Those of ordinary skill in the art will recognize that in this client/server configuration, the remote computer 11 may function as a file server or computer server.

The personal computer 10 includes a central processing unit (CPU) 14, such as the 80486 or "PENTIUM" microprocessors manufactured by Intel Corporation of Santa Clara, Calif. The personal computer also includes system memory 15 (including read only memory (ROM) 16 and random access memory (RAM) 17), which is connected to the CPU 14 by a system bus 18. A basic input/output system (BIOS) 19 for the personal computer 10 is stored in ROM 16. Those skilled in the art will recognize that the BIOS 19 is a set of basic routines that helps to transfer information between elements within the personal computer 10.

Within the personal computer 10, a local hard disk drive 20 is connected to the system bus 18 via a hard disk drive interface 21. A floppy disk drive 22, which is used to read or write a floppy disk 23, is connected to the system bus 18 via a floppy disk drive interface 24. A CD-ROM drive 25, which is used to read a CD-ROM disk 26, is connected to the system bus 18 via a CD-ROM interface 27. A user enters commands and information into the personal computer 10 by using a keyboard 28 and/or pointing device, such as a mouse 29, which are connected to the system bus 18 via a serial port interface 30.

Other types of pointing devices (not shown in FIG. 1) include track pads, track balls, and other devices suitable for positioning a cursor on a computer monitor 31. The monitor 31 or other kind of display device is connected to the system bus 18 via a video adapter 32.

The remote computer 11 in this networked environment is connected to a remote memory storage device 33. This remote memory storage device 33 is typically a large capacity device such as a hard disk drive, CD-ROM drive, magneto-optical drive or the like. The personal computer 10 is connected to the remote computer 11 by a network interface 34, which is used to communicate over the local area network 12.

As shown in FIG. 1, the personal computer 10 is also connected to the remote computer 11 by a modem 35, which is used to communicate over the wide area network 13, such as the Internet. The modem 35 is connected to the system bus 18 via the serial port interface 30. Although illustrated in FIG. 1 as external to the personal computer 10, those of ordinary skill in the art will quickly recognize that the modem 35 may also be internal to the personal computer 11, thus communicating directly via the system bus 18. It is important to note that connection to the remote computer 11 via both the local area network 12 and the wide area network 13 is not required, but merely illustrates alternative methods of providing a communication path between the personal computer 10 and the remote computer 11.

Although other internal components of the personal computer 10 are not shown, those of ordinary skill in the art will appreciate that such components and the interconnection between them are well known. Accordingly, additional details concerning the internal construction of the personal computer 10 need not be disclosed in connection with the present invention.

Those skilled in the art will understand that program modules such as an operating system 36, application programs 37, and data are provided to the personal computer 10 via one of the local or remote memory storage devices, which may include the local hard disk drive 20, floppy disk 23, CD-ROM 26, RAM 17, ROM 16, and the remote memory storage device 33. In the preferred personal computer 10, the local hard disk drive 20 is used to store data and programs, including the operating system and programs.

FIG. 2 is a simplified block diagram illustrating the interaction between the computer hardware 200, the operating system 36, and an application program 37a. Referring now to both FIGS. 1 and 2, when the personal computer 10 is turned on or reset, the (BIOS) 19, which is stored in the ROM 16, instructs the CPU 14 to load the operating system 36 from the hard disk drive 20 into the RAM 17. Once the operating system 36 is loaded into RAM 17, the CPU 14 executes the operating system 36 and causes the visual elements associated with the user interface of the operating system 36 to be displayed on the monitor 31.

The operating system 36, in conjunction with the BIOS 19 (FIG. 1) and associated device drivers, provides the basic interface between the computer's resources, the user, and the application program 37a. The operating system 36 interprets and carries out instructions issued by the user. For example, when the user wants to load an application program 37a, the operating system 36 interprets the instruction (e.g., double clicking on the application program's icon) and causes the CPU 14 to load the program code into RAM 17 from either the local hard disk drive 20, floppy disk 23, CD-ROM 26, or the remote memory storage device 33. Once the application program 37a is loaded into the RAM 17, it is executed by the CPU 14. In case of large programs, the CPU 14 loads various portions of program modules into RAM 17 as needed.

As discussed earlier, the preferred embodiment of the present invention is embodied in a view displaying program module called "Views" which may be used in a personal information manager application such as the personal information manager application called "OUTLOOK," which is designed to operate in conjunction with Microsoft Corporation's "WINDOWS 95" or "WINDOWS NT" operating systems. However, it should be understood that the invention can readily be implemented in other operating systems, such as Microsoft Corporation's "WINDOWS 3.1" operating system, IBM Corporation's "OS/2" operating system, and the operating system used in "MACINTOSH" computers manufactured by Apple Computer, Inc.

The operating system 36 provides a variety of functions or services that allow an application program 37a to communicate with various types of input/output (I/O) devices.

This allows the application program 37a to issue relatively simple function calls that cause the operating system 36 to perform the steps required to accomplish various tasks, such as displaying text on the monitor 31 (FIG. 1) or printing text on an attached printer (not shown). Generally described (with reference to FIG. 2), the application program 37a communicates with the operating system 36 by calling predefined functions provided by the operating system 36. The operating system 36 responds by providing the requested information in a message or by executing the requested task.

From this brief description, it should be appreciated that operating systems, such as the "WINDOWS 95" and "WINDOWS NT" operating systems, are quite complex and provide a wide variety of services that allow users and programs to utilize the resources available in the personal computer. Those skilled in the art will be familiar with operating systems and their various features, which include, but are in no means limited to, the specific messages and functions described above. For more comprehensive information regarding the "WINDOWS 95" and "WINDOWS NT" operating system and its interaction with programs, the reader may refer to any of a variety of publications, including the "Win32 Programmer's Reference" published by Microsoft Press and "Advanced Windows" published by Microsoft Press.

Likewise, those skilled in the art will appreciate that the preferred personal information management program, "OUTLOOK," provides a wide variety of features and functions in addition to those included in the brief description presented above. For additional information regarding the "OUTLOOK" program, the reader may refer to the documentation that is distributed by Microsoft Corporation with the "OUTLOOK" program.

Definitions

Figure 11A:

As used herein, a "view" refers to a container containing a view control type which define settings that describe the view's visual appearance and behavior. These settings include sort order for the data, specific fields the user has defined, and view modes. FIG. 11a and 11b each provide an example of a view. FIG. 11a shows a calendar type view populated with data of different basketball teams names scheduled on specific days of a month. FIG. 11b shows a table type view depicting several fields and populated with data. An example of a view mode for FIG. 11a, the calendar view, would either be monthly, weekly, or daily.

As used herein, "field" refers to the classification of data stored in an item. In FIG. 11b, field 1150 is a classification of data called "Opponent" and field 1155 is a classification called "Division." The field is defined by the user or the application that creates the field.

As used herein, "data" refers to the information contained with the field classification. In FIG. 11b, data 1160 ("LA Clipper," "Denver Nuggets," "Vancouver Grizzlies," "Philadelphia 76ers") is all information classified by the field "Opponent" 1150.

The Preferred System For Defining a View to Display Data

The preferred embodiment will be discussed as to the architecture of its implementation and the method for defining a view to display data.

Architecture of the preferred embodiment

Figure 3A:
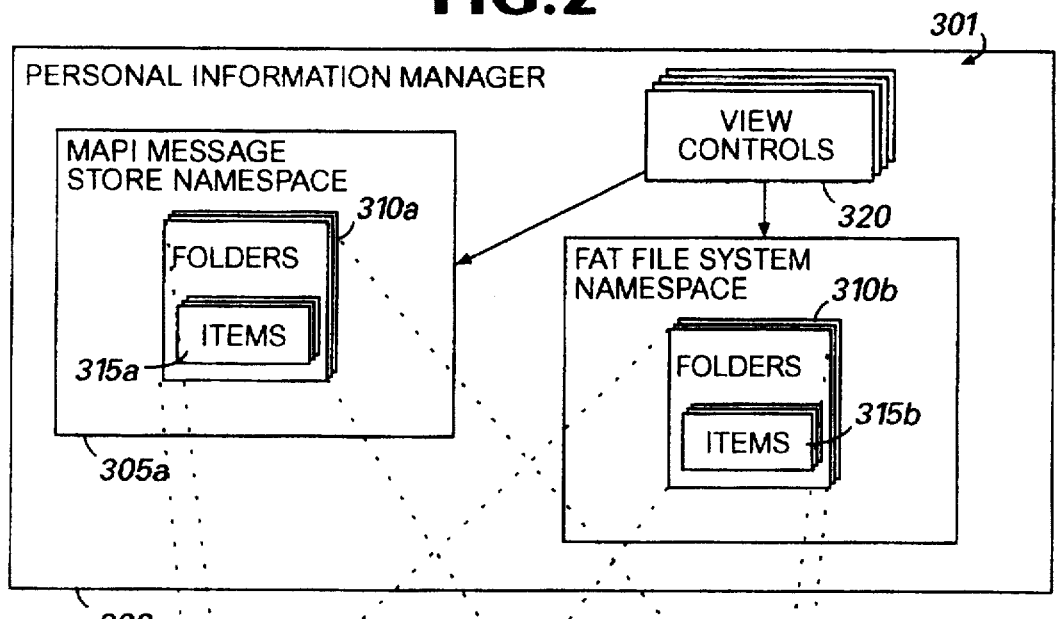
FIG. 3a and 3b are block diagrams depicting the architecture of the preferred embodiment of the present invention.
Figure 3B:
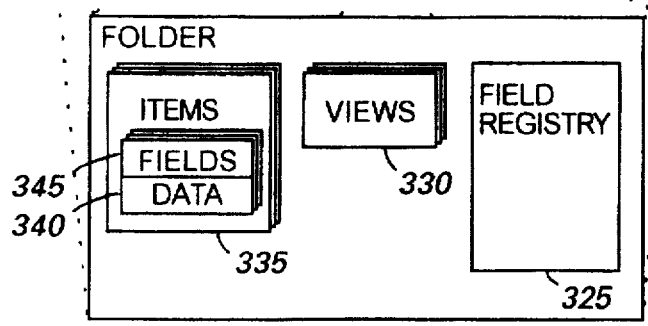

Turning now to FIGS. 3a and 3b, the architecture for the preferred embodiment of the view displaying program module is depicted. FIG. 3a depicts the four main object components of the architecture of the preferred embodiment of the view displaying program module 301 residing within the personal information manager 300. These four components include: namespaces 305a and 305b, folders 310a and 310b, items 315a and 315b, and view controls 320. FIG. 3b depicts an exploded view of the folders 310a and 310b. Note that the items 315a and 315b in FIG. 3a represent the same structure as items 335 in FIG. 3b. Also note that the folders 310a and 310b have the same structure 325–345 even though they may reside in different namespaces 305a and 305b. Stacked boxes are used in FIGS. 3a and 3b to represent that the number of architectural components varies. For example, FIG. 3a depicts 4 stack boxes for the view controls 320. This does not imply 4 view controls 320 but that variable number of view controls 320 exists in the preferred embodiment. In fact, the preferred embodiment describes five view controls and supports the installation of additional view controls. As stated earlier, the personal information manager 300 is an application that interfaces with other applications that are designed to help someone organize tasks, electronic mail, and scheduling. Other applications can be interfaced to the personal information manager. The personal information manager used in the preferred embodiment is the "OUTLOOK" program which is marketed by Microsoft Corporation of Redmond, Wash.

The components (305–320, 330, 335) of the preferred view displaying program module 301, although functionally linked, are configured as a cooperating set of objects. An object is a self-contained program unit in object-oriented computer programming including instructions (e.g., executable code) or data (e.g., operands), or both. Objects communicate with each other by way of predefined interfaces. An interface is a data structure, syntax, and protocol for communicating predefined instructions or data with an object. Use of object oriented programming allows the functional components to communicate and pass information back and forth while permitting the abstraction of the data type of the actual data. This feature provides the basis to interface data from different applications into one view by not directly defining a specific data type to the view. It will be recognized by someone skilled in the art that the use of object oriented programming is one method to utilize this feature and that other programming languages can be used to functionally perform the same task and therefore are within the scope of the present invention.

Returning to FIGS. 3a and 3b, which depict the architecture of the preferred view displaying program module 301. It will be recognized by someone skilled in the art that functions performed by each of these components are not strictly defined. In other words, functions that one component performs can by moved to another component while staying within the scope of the present invention. The preferred view displaying program module 301 employs two namespace objects, the Messaging Applications Programming Interface (MAPI) message store 305a and a File Allocation Table (FAT) file system 305b, each of which contain folders 310a and 310b. Items 315a and 315b, contained within folders 310a and 310b, are segregated into a namespace 305a and 305b such that each item 315a and 315b within that namespace 305a and 305b share the same activation, transfer, and query properties. The MAPI message store namespace 305a is used to store all items 315a that function as mail messages. An example of a MAPI message store namespace 305a is an item 315a that contains data 340 for an appointment. The FAT file system namespace 305b stores all document types. It will be recognized by someone skilled in the art that the grouping of items 315a and 315b within a namespace 305a and 305b can be performed many ways. In addition, the present invention is not limited to the two namespaces 305a and 305b described above. The structure disclosed in the invention supports additional namespaces to be added depending on how the programmer wishes to group the items 315a and 315b. It is important to note that although the folders 310a and 310b are contained within a namespace 305a and 305b that the namespaces 305a and 305b do not keep track of the actual data type of the data 340 in the items 315a and 315b contained within the folders 310a and 310b.

Each namespace 305a and 305b contains at least one folder such as 310a and 310b respectively. In the preferred embodiment, folders 310a and 310b contains items 315a and 315b respectively that are of similar type. The preferred embodiment comprises seven folder types: (1) calendar, (2) task, (3) e-mail, (4) journal, (5) note, (6) contact, and (7) document management. Folders 310a and 310b merely represent folders of these types and do not imply that only a limited number of folders exist in a namespace. Referring to FIG. 3b, folders 310a and 310b also contain a field registry, such as field registry 325 which lists all the fields 345 that are contained within the items 335 contained in either folder 310a or 310b. In addition, views 330 that are used to display the items 335 within folders 310a and 310b are associated with that folders 310a and 310b. The views 330 include default views included with the preferred embodiment installation and user defined views. Folders 310a and 310b, although containing items 335, are not "aware" of the data type of the data 340 that is associated with the field 345 of the item 335.

Items 315a and 315b, 335 are used to store the fields 345 and data 340 used in the views 330. (As stated earlier, items 315a and 315b and items 335 refer to the same item structure. In the description of the detailed embodiment, one item number (e.g., 335) may be used for ease of readability, but the characteristics described apply to all the items 315a and 315b, 335.) Items 335 are created by one of the applications which interface to the program information manager 300. Items 335 are the only components in the preferred embodiment architecture that are "aware" of the data type of the data 340 to be displayed. The items 335 will also provide some intelligence to the data 340. For example, an "appointment" may be considered an item 335. The appointment item 335 contains several fields 345 such as start and stop time of the appointment. The appointment item 335 contains the actual data 340 specifying when the appointment will start and when it will stop. But the appointment item 335 may also contain some information about the appointment. For example, the item 335 may be implemented to preclude the user from assigning a stop time prior to the start time.

The final major component of the preferred view displaying program module 301 is the view control 320. The preferred view displaying program module 301 supports five types of view controls: (1) calendar, (2) table, (3) icon, (4) card, and (5) timeline. FIG. 3a depicts view controls 320 which represent any of the five view control types listed above. The preferred view displaying program module 301 supports from one to five of the view control types, simultaneously. The preferred view displaying program module 301 also supports the installation of additional view control types. A view control 320 provides a basic format for the view. The view control 320 is given access to the fields 345 and the data 340 within an item 335 to display. The view control 320, however, does not know the data type of the data 340. The view control's function is to provide a base format and to get the fields 345 and data 340 for a specific view 330. The view control 320 provides this information to the view 330 for display. The data 340 that resides in an item 335 is not tied to any specific view control 320 and therefore it is not tied to any specific view 330. The preferred view displaying program module 301 is extensible because one item 335, and therefore one piece of data 340, can be used by any view control 320 and therefore can be displayed in any view 330. Furthermore, views 330 are not tied to a data type and therefore can display data 340 from any item 335.

Method for defining a view to display data

Figure 4:
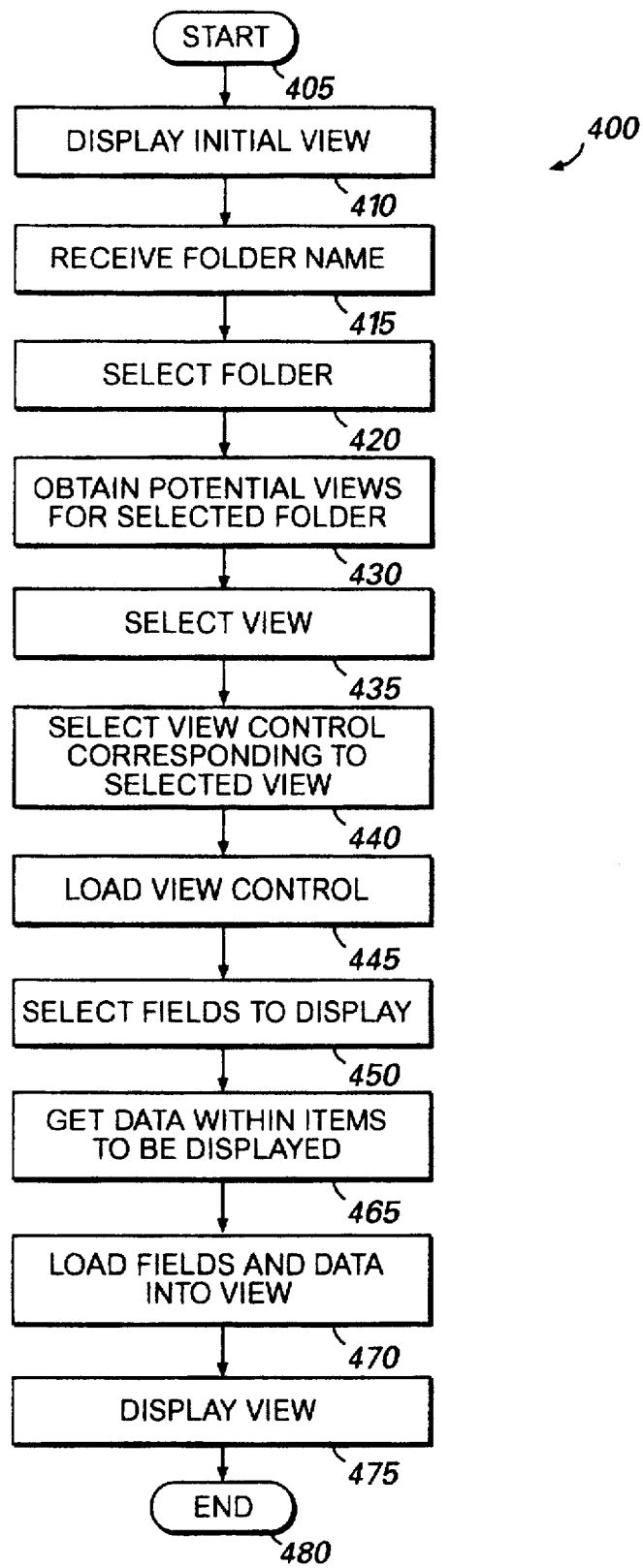
FIG. 4 is a flow diagram illustrating the preferred process of selecting a view for display.

Turning to FIG. 4, the method 400 of selecting a view will be described in detail. The method 400 begins at step 405 and proceeds to step 410. At step 410, the user is presented with a view, such as view 330. This view is either a default view which is displayed upon the initial startup of the preferred view displaying program module 301 or when a view has been selected by the user. The initial view contains a list of folders obtained by searching a default namespace or the last namespace that the user was working in. The search yields a list of all folder names located within that namespace. The user is presented with this listing of folder names. This display of folders may be by name or icon representing the folder. But the listing of folder names can be by any type of character or graphic, or combination thereof, that creates an impression of a specific folder to the user.

Figure 5:
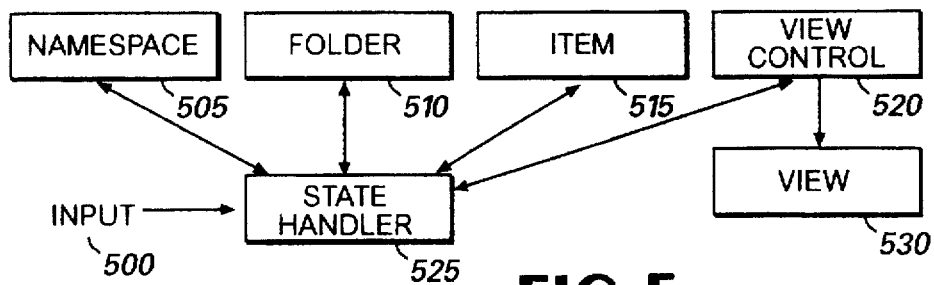
FIG. 5 is a data flow diagram showing the data flow between elements in the preferred embodiment of the present invention.

Step 415 continues with a state handler receiving the name of a folder from an input device. As is recognize by those skilled in the art, a state handler collects information from one object and passes it to another object. FIG. 5 depicts the data flow between the objects 505–525 in the preferred embodiment. In the preferred embodiment, the state handler acts as a "traffic cop" passing information from the input device 500 and between the objects 505–520. Returning to the method 400 and step 415, the input will typically be done by the user selecting from a list of folders presented on the display. The selection can be done by use of a mouse with a display pointer. The user manipulates the mouse pointer to place it over the desired folder, double clicking on the folder that the mouse pointer is currently pointing to. But other methods of selecting the folder may be used.

When the user selects the folder at step 420, the state handler selects the folder object that corresponds to the folder name selected. The state handler performs this by calling the active namespace object (i.e., the one the user selected the folders from) for a list of folder objects. Then the state handler selects the folder object that corresponds to the folder name that was selected by the user.

At step 430, the list of views associated with the selected folder object is obtained. The selected folder may have predefined or user defined views associated with it. The concept of predefined and user defined views have been previously discussed.

After step 430, the method 400 continues to step 435 where a view from the list of views is selected. Typically, the last view that was presented when the folder was selected will be displayed from the list of views. Otherwise, the user may select one view from the list of views in the folder. The user selection may be perform through a menu bar popdown menu or selecting an option within the display.

After selecting the view at step 430, the method 400 continues to step 440 where a view control is selected. As discussed in the definition section, each view will have a view control associated with it. The view control provides the basic format on which the view is based on.

Proceeding to step 445, the view control that was selected in step 440 is loaded. At this point the method 400 has loaded a view and the view control associated with it but no data has been retrieved. The correct fields and data required by the view and view control must now be retrieved.

The method continues to step 450 where the method selects the fields for display. A folder can contain many items each having many fields. To provide quick access to all the fields, the folder stores a field registry which lists all the fields contained in the items located in that folder. Any time a new field is added to an item in a folder, the new field is added to the folder's field registry. Anytime a new item is created or stored in a folder, the field registry is updated with all the fields associated with that item.

Continuing with step 450, the view control retrieves the field registry from the folder by means of the state handler.

This provides the view control with a complete list of all the possible fields for display from the selected folder. The view control has default fields associated with it. The user may have added or deleted some of the default fields for a specific view. These additions and deletions are defined within the view. The view control modifies its default list of fields with the modifications stored in the view to define the complete list of fields required for the view. The view control passes the complete list of fields required for the view to the folder. At this point, the data still has not been retrieved. And although the view control has received the fields, it is not aware of the data type for the fields or what application created them.

Proceeding to step 465, data within items for display are retrieved. The view control has selected a list of fields for the view and now needs data for the view. To prevent the inextricable link between the data and the view, the view control gets a pointer to the data within the items that correspond to the selected list of fields. To get this data address, the view control passes the selected field list, via the state handler, to the folder. The folder determines which items contain any of the fields in the field list. The folder passes a pointer to the data within the items back to the view control, via the state handler. The folder and view control are still unaware of the data type of the data that is contained within the field.

The view control now has a pointer to the data and the selected fields for display. Proceeding to step 470, the view control loads this information into the view. The view now can display the fields and data specific to that view. The data remains in the item and is linked to the view while the view is displayed. The data in the item is available for other views to use even while the current view is being displayed. The view control was used to define the view while never being required to know the data type of what is to be displayed.

Continuing with step 475, the view displays the fields and information. And the method 400 ends at 480.

Editing a view

Figure 6:
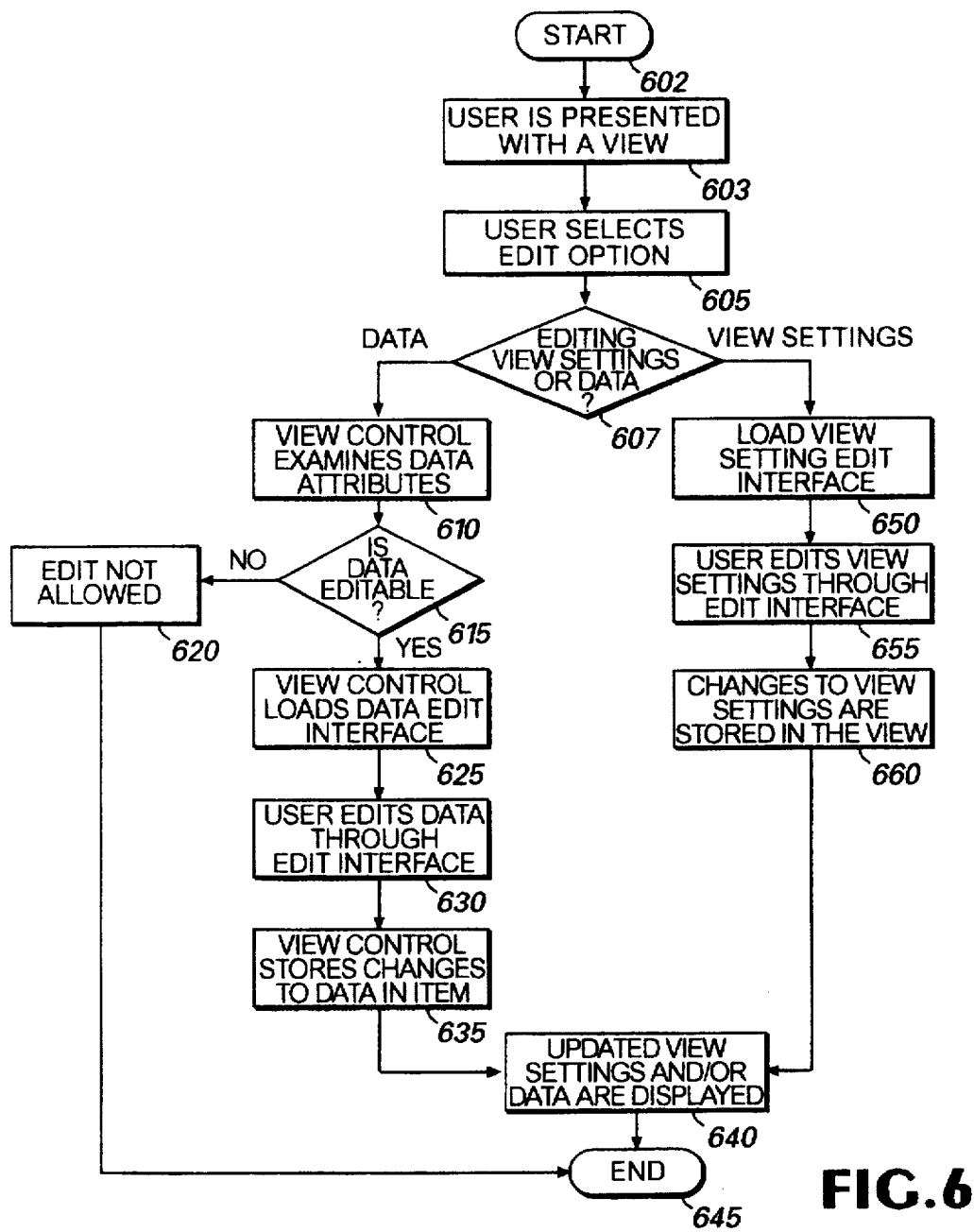
FIG. 6 is a flow diagram illustrating the preferred process of editing a view for display.

The present invention also provides for a method to edit a defined view. Information to be edited includes data being displayed by the view and the view settings. This method is depicted in FIG. 6. In the preferred embodiment, the method 600 to edit a view begins at 602 and proceeds to step 603. At step 603, a user is presented with a view. An example of a displayed view is shown in FIG. 11a and 11b. The method for presenting this view can be in accordance with the method 400.

At step 605, the user selects an edit option to edit either the view settings or data being displayed. Those skilled in the art will recognize that this selection may be implemented in a variety of ways including a pull down menu from a menu bar, a popup menu located elsewhere on the display, or by directly selecting the displayed data.

At step 607, the view displaying program module 301 determines if the user is editing data or view control settings. If data is being edited, method 600 continues with step 610. If view settings are being edited, method 600 continues with step 650.

At step 610, the selected view control examines the data attributes associated with the data to be edited. As described above in connection with method 400, a view control is associated with a view. In step 610, the view control that is associated with the view is loaded if it has not already been loaded. The data attribute will signify whether the data can be edited or not. In the preferred embodiment, these data attributes will be located in the field registry of the folder associated with the view. As those skilled in the art will recognize, these attributes can be stored in many ways other than in the field registry. Furthermore, data may be defined as not editable for many reasons. The user may not want the data to be edited and therefore may specify that the data not be editable. Also, data may hold particular importance in an application program so that the implementers of the application do not want to give the user the ability to edit specific data. In any event, the preferred embodiment stores this attribute in the field registry.

The method 600 continues with step 615 wherein the view control determines if the data is editable. Based on an examination of the data attribute described in step 610, if the attribute signifies that the data is not editable, then the method 600 proceeds to step 620 where no edits are allowed. Following step 620, the method 600 ends.

If the data attribute from step 610 signifies that the data is capable of being edited, then method 600 proceeds to step 625 by the view control loading an edit interface. Those skilled in the art will recognize that the variations of editing interfaces are numerous. Edit interfaces may employ command line or graphic interfaces and have multiple layered windows. The type of edit interface used does not effect the method 600 of the preferred view displaying program module 301.

The method 600 continues with step 630, wherein the user modifies the data through an edit interface, such as one of those described in step 625. Examples of edits to data supported by the preferred view displaying program module 301 include:

1. The user modifying the existing data in the fields of the items.

2. The user adding data in new fields of the items.

3. The user adding a formula to a calculable field, wherein the user will input a formula to operate on data from other fields. For example, for a calculable field, "field3," the user enters a formula for field3, "field1+field2."

After the user has made any edits to the data, method 600 proceeds to step 635, wherein the view control stores the edits made by the user. Changes to the data are stored in the item, even though the data in the item may have been created by another application. The method 600 then continues with step 640.

Figure 12:
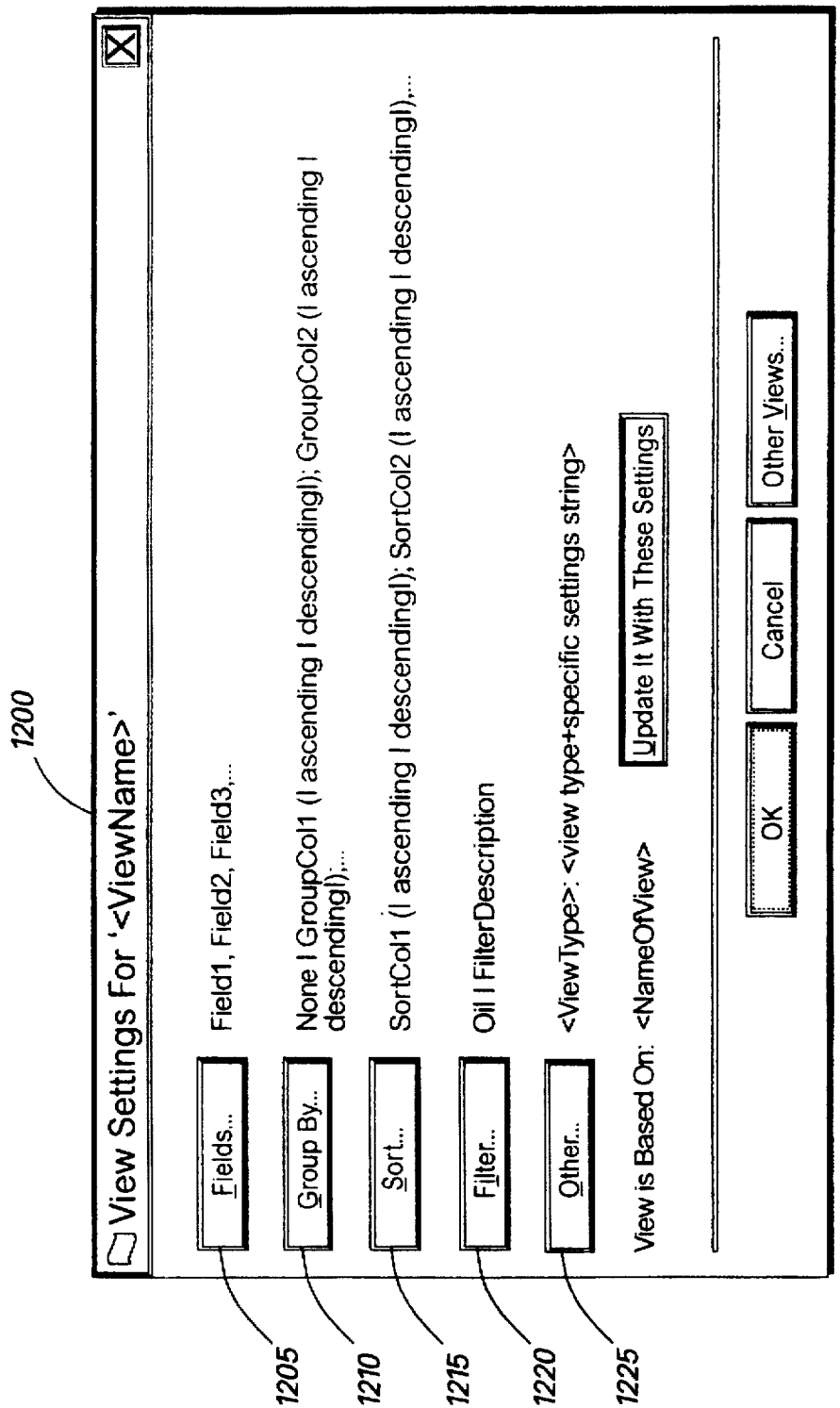
FIG. 12 is an example of a screen format for editing a view settings in the preferred embodiment.

If at step 607 the view displaying program module 301 determined that the user is editing view settings, the method 600 continues with step 650 where the view displaying program module 301 loads a view setting edit interface. FIG. 12 shows an example of a view setting edit interface in the preferred view displaying program module 301. In a view setting edit interface, the user is presented with the ability to modify the view settings (see "definitions" for examples of view settings). FIG. 12 shows a view setting edit interface 1200 to modify/insert fields 1205, define groups of fields 1210, change the sort order 1215 (i.e., ascending vs. descending), apply a filter 1220 (i.e., prevent the display of fields not meeting certain criteria), and provide an option to access additional settings 1225. FIG. 12 depicts an example of a view setting edit interface in the preferred embodiment and does not imply that those are the only edits that may be performed. Additional edits, although not shown, may be made through similar or different edit interfaces, and such edits do not effect the method 600 of the preferred view displaying program module 301.

Following the loading of the view setting edit interface, method 600 continues with step 655 wherein the user edits the view settings. As described in step 650 and in the definition section, edits to view settings include changing the sort order of the fields, adding fields, applying filters, etc.

At step 660, any changes made to the view settings are stored in the view. In addition, the folder's field registry that is associated with the current view is updated with any new fields created. The method 600 continues with step 640.

At step 640, the updated view settings and/or data are displayed. Upon completion of the edits, any of the changes to the view settings and fields will be reflected in the display of the view. The user has created a new view which may be stored in the folder.

The method 600 ends at step 645.

Adding new view controls

Figure 7:
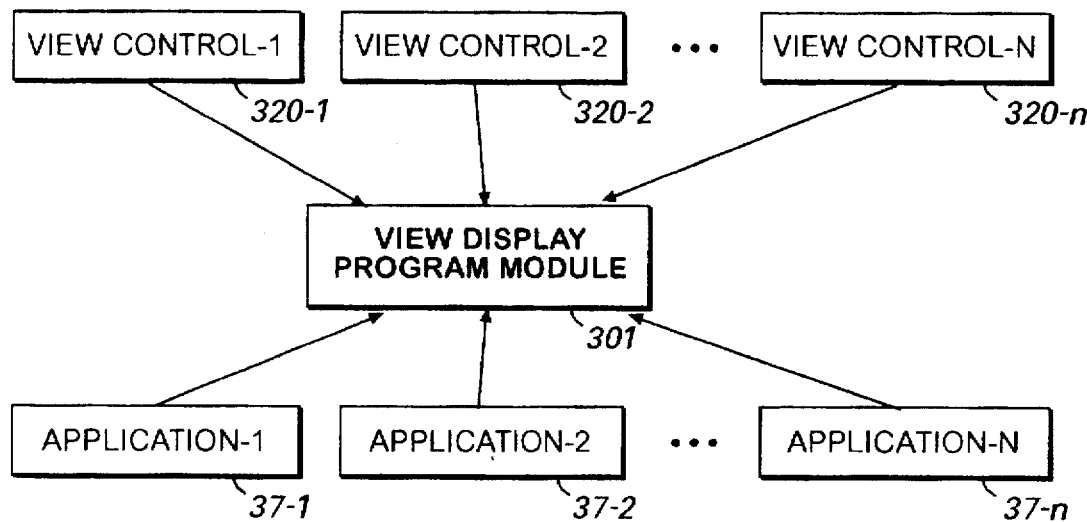
FIG. 7 is a block diagram illustrating the extensibility of the preferred embodiment of the present invention.

FIG. 7 depicts the extensibility of the preferred view displaying program module 301 with a plurality of view controls 320-1 through 320-n. Although the preferred embodiment currently uses five view controls (n=5), the architecture of the preferred view displaying program module 301 will support additional view controls not currently developed with the upper limit being what could be reasonably supported by computer hardware.

Figure 10:
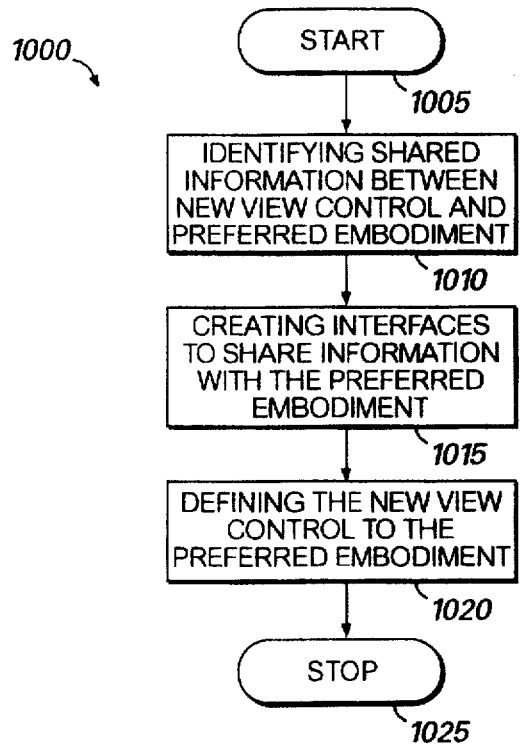
FIG. 10 is a flow diagram for illustrating the preferred process of installing a new view control.

The method 1000 for installing a new view control, such as view control 320-6, is presented in FIG. 10. As stated earlier, the preferred view displaying program module 301 resides in a personal information manager, such as the personal information manager named "OUTLOOK" developed by Microsoft Corporation OUTLOOK runs under the "WINDOWS 95" operating system. It will be recognized by someone skilled in the art that applications and objects may be develop to use standard interfaces defined by Object Linking and Embedding (OLE). "WINDOWS 95" utilizes the OLE standard. It will be recognized by those skilled in the art that OLE provides a method for one application to access the services of another. For more information regarding OLE, refer to OLE Programmer's Reference Guide" published by Microsoft press. The method 1000 is the process to install a new view control in the preferred view displaying program module 301. It will be recognized by those skilled in the art that different platforms may use other standards. Although the process will be consistent as described herein, these different platforms will require that the view control follow those standards, not the necessarily the standards defined by OLE.

The method 1000 begins at step 1005 and proceeds to step 1010. At step 1010, the information required for sharing with the preferred personal information manager and the preferred view displaying program module 301 needs to be identified. A new view control will be required to communicate with the preferred view displaying program module 301.

Continuing to step 1015, creating the interface to pass and receive information required by the preferred view displaying program module 301. In the preferred view displaying program module 301, the standard for creating the interfaces are defined by OLE. A new view control must be prepared to share the information required for use by the new view control and the preferred view displaying program module 301 using the conventions defined by OLE.

The method 1000 continues to step 1020 wherein, the new view control program module is defined to the preferred view displaying program module 301. At step 1020, a new view control has the information to pass to the preferred view displaying program module 301 and has the format (i.e., standard interfaces) with which to pass them. So step 1020 makes the preferred view displaying program module 301 and the new view control both aware of each other so they can communicate. Step 1020 requires that the new view control module be entered into the operating system's application registry (e.g., the "Window's 95 Registry database"). This registry is where all the applications that can communicate by way of standard interfaces are listed. Applications know that other applications exist within the operating system by referring to this register. In other environments, the view displaying program module 301 must also be notified that a new view control exists and be given access to it. It will be recognized that there are a multitude of platforms, operating systems, and potential applications that may utilize the view displaying program module 301 described herein. Each may have its own way of performing step 1020. Those skilled in the art will recognize how to define a new view control for the view displaying program module 301 for a given platform, operating system, and application that utilize the view displaying program module 301.

FIG. 7 also depicts the extensibility of the view displaying program module 301 by showing its support of a multitude of applications 37-1 through 37-n. The architecture for the preferred view displaying program module 301 supports the inclusion of new applications such that data created by new applications 37-1 through 37-n can be utilized by the preferred view displaying program module 301.

Additional Characteristics Of The Preferred View Displaying Program Module

Figure 8:
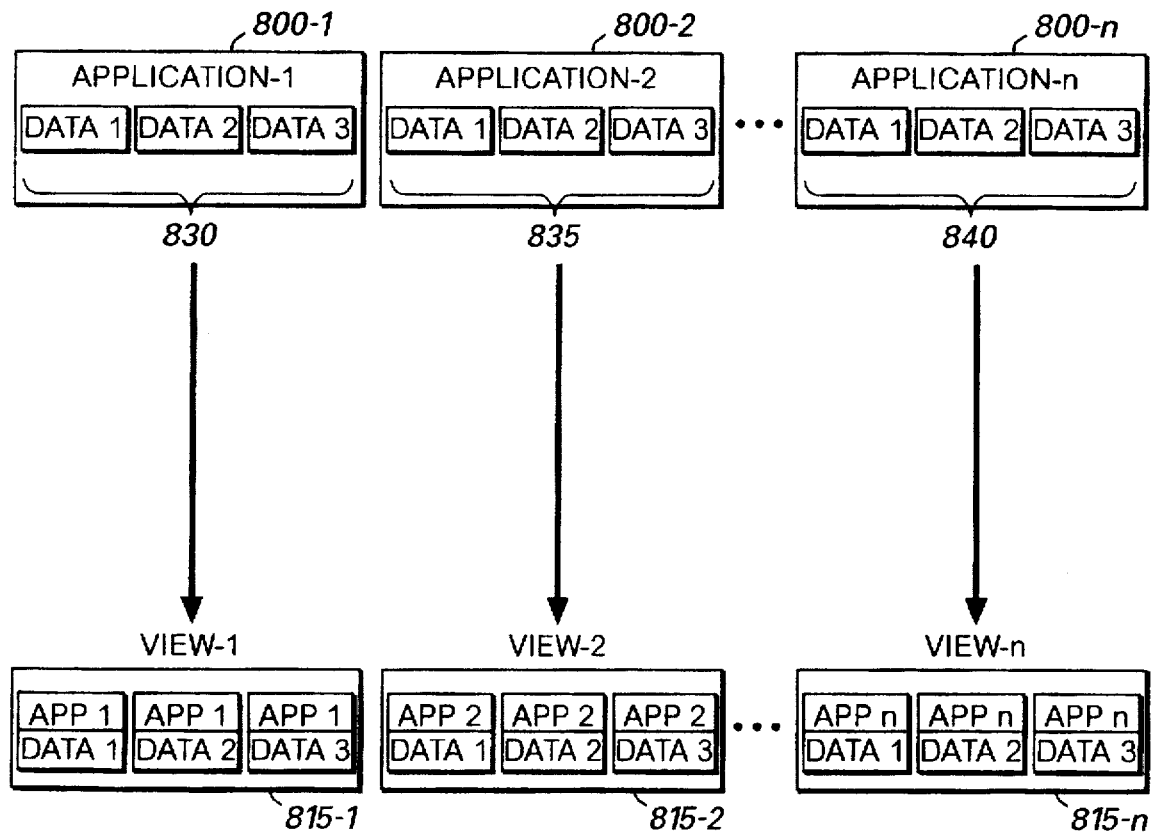
FIG. 8 is a block diagram illustrating the interaction between application programs and displaying views prior to the present invention.
Figure 9:
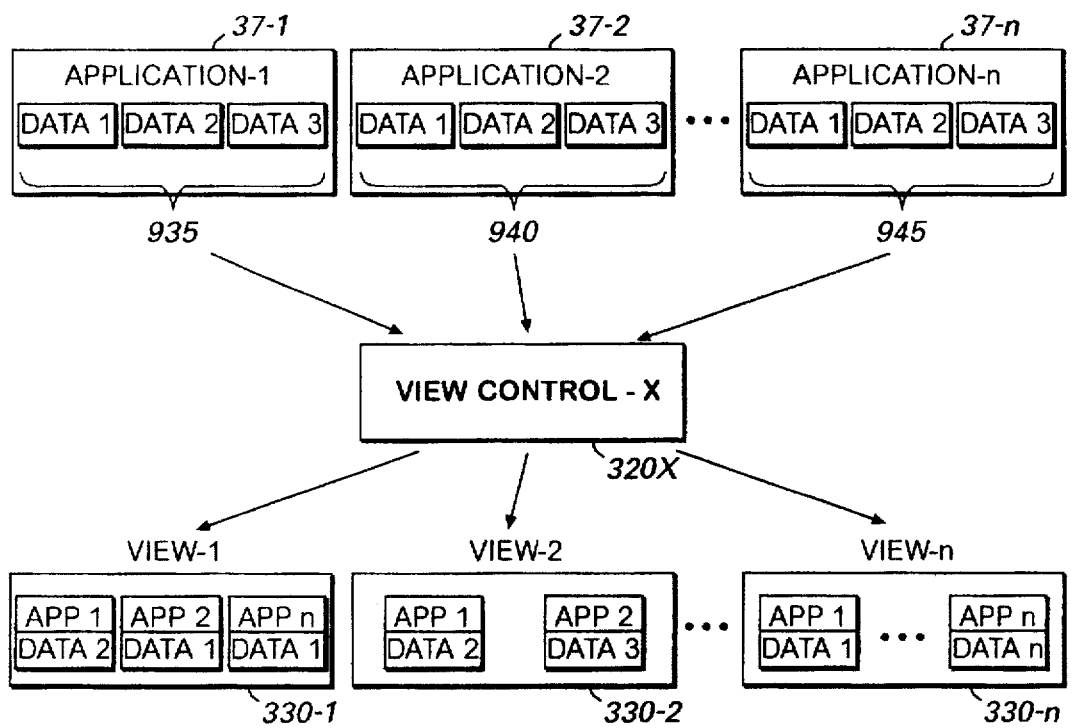
FIG. 9 is a block diagram illustrating the interaction between application programs and displaying views of the preferred embodiment of present invention.

FIGS. 8 and 9 compare the conventional method of viewing data and the method 400 of viewing data in accordance with the present invention, respectively. FIG. 8, the conventional method, view 815-1 only displays data 830 that is associated with application 800-1. Likewise, view 820-2 displays data 835 associated with application 805-2 and so on for additional views and applications. In the preferred method 400, shown in FIG. 9, data 935-945 created from multiple applications 37-1 through 37-n can be intertwined and displayed through views 330-1 through 330-n. Each view 330-1 through 330-n utilizing a view control 320x which provides each view 330-1 through 330-n accessibility to data 935-945 developed in any of the applications 37-1 through 37-n.

SUMMARY OF THE DETAILED DESCRIPTION

From the foregoing description, it will be appreciated that the present invention provides a system and method for defining a view to display data. Views and view controls are used to display and access data created from multiple applications. Namespaces, folders, items, views, and view control objects are used to abstract the data type of the data contained in items. Therefore, data can be displayed in multiple views, and the same view can be used to display data independently of the data type. To display a view, a user selects a folder that contains items. A folder, item, view, and view control work together to define the fields and data for display and the format for displaying them. The user can generate many views by editing one view, thereby creating a new view. An edit interface is provided allowing the user to modify a view. Modifications include entering new data in a view, defining new fields, and entering calculations based on other data. A new view control can be installed by determining what information to pass, conforming to OLE standards and entering the view control in the operating system's database registry.

Alternative embodiments will become apparent to those skilled in the art to which the present invention pertains without departing from its spirit and scope. Accordingly, the scope of the present invention is defined by the appended claims rather than the foregoing description.

What is claimed is:

1. In a computer system comprising a processor, an input device, a display device, and a memory for storing program modules, all operatively interconnected, a view displaying program module in the memory comprising:
   a. at least one namespace for storing at least one folder wherein the folder stores:
      i. at least one view wherein the view manages and stores an index to data for display;
      ii. a list of fields; and
      iii. at least one item, wherein the item contains at least one field wherein the field contains data that defines an operand or an instruction; and
   b. a view control for:
      i. selecting one folder in one namespace in response to input from the input device;
      ii. selecting one view associated with the selected folder;
      iii. selecting one field from the list of fields in the selected folder;
      iv. selecting one item containing the selected field;
      v. retrieving the data corresponding to the selected field from the selected item; and
      vi. displaying the view on the display device.
2. The view displaying program module of claim 1, wherein the view displaying program module further comprises an edit interface for:
   a. receiving a command from the input device to identify and edit one view in one folder in one namespace;
   b. editing the view settings associated with the identified view;
   c. selecting a field associated with the identified view;
   d. editing the data contained in the field associated with the identified view;
   e. storing the edits; and
   f. displaying the edited view.
3. The view displaying program module of claim 2, wherein step 2(d) comprises:
   d(1). changing the data in the selected field.
4. The view displaying program module of claim 2, wherein step 2(b) comprises:
   b(1). adding a field to the identified view.
5. The view displaying program module of claim 2, wherein step 2(d) comprises:
   d(1). entering an instruction into the selected field of the identified view.
6. The view displaying program module of claim 1, wherein the view displaying program module further operates to install a new view control by:
   a. identifying information to be shared between the new view control and the view displaying program module,
   b. modifying the new view control allowing it to share the information to the view displaying program module,
   c. defining the new view control to the view displaying program module.
7. In a computer system comprising a processor, an input device, a display device, and a memory for storing program modules, all operatively interconnected, a view displaying program module in the memory comprising:
   a. at least one namespace for storing at least one folder wherein the folder stores:
      i. at least one view wherein the view manages and stores an index to data for display;
      ii. a list of fields; and
      iii. at least one item, wherein the item contains at least one field wherein the field contains data that defines an operand or an instruction; and
   b. a view control for selecting which fields to display on the display, a method for selecting a view comprising the steps of:
      i. selecting one folder in one namespace in response to input from the input device;
      ii. selecting one view associated with the selected folder;
      iii. selecting one field from the list of fields in the selected folder;
      iv. selecting one item containing the selected field;
      v. retrieving the data corresponding to the selected field from the selected item; and
      vi. displaying the view on the display device.
8. The method of 7, wherein the method further comprises the steps of:
   a. editing the view comprising the steps of:
      i. receiving a command from the input device to identify and edit one view in one folder in one namespace;
      ii. editing the view settings associated with the identified view;

iii. selecting a field associated with the identified view;
iv. editing the data contained in the field associated with the identified view;
v. storing the edits; and
vi. displaying the edited view.

9. The method of claim 8(a), wherein step 8(a)(iv) comprises:

iv(1). changing the data in the selected field.

10. The method of claim 8(a), wherein step 8(a)(ii) comprises:

ii(1). adding a field to the identified view.

11. The method of claim 8(a), wherein step 8(a)(iv) comprises:

iv(1). entering an instruction into the selected field of the identified view.

12. The method of claim 7, wherein the method further comprises the steps of:

a. installing a new view control comprising the steps of:
   i. identifying information to be shared between the new view control and the view displaying program module,
   ii. modifying the new view control allowing it to share the information to the view displaying program module,
   iii. defining the new view control to the view displaying program module.

13. A computer system comprising: a bus operatively interconnecting:

a. a processor;
b. an input device;
c. a display device;
d. a memory for storing program modules wherein the memory includes means for displaying views of data on the display device comprising:
   i. at least one namespace for storing at least one folder wherein the folder stores:
      a at least one view wherein the view manages and stores an index to data for display;
      b. a list of fields; and
      c. at least one item, wherein the item contains at least one field wherein the field contains data that defines an operand or an instruction; and ii. a view control for:
   a. selecting one folder in one namespace in response to input from the input device;
   b. selecting one view associated with the selected folder;
   c. selecting one field from the list of fields in the selected folder;
   d. selecting one item containing the selected field;
   e. retrieving the data corresponding to the selected field from the selected item; and
   f. displaying the view on the display device.

14. The system of claim 13, wherein the further comprises an edit interface for:

a. receiving a command from the input device to identify and edit one view in one folder in one namespace;
b. editing the view settings associated with the identified view;
c. selecting a field associated with the identified view;
d. editing the data contained in the field associated with the identified view;
e. storing the edits; and
f. displaying the edited view.

15. The system of claim 14 wherein step 14(d) comprises:

d(1). changing the data in the selected field.

16. The system of claim 14 wherein step 14(b) comprises:

b(1). adding a field to the identified view.

17. The system of claim 14 wherein step 14(d) comprises:

d(1). entering an instruction into the selected field of the identified view.

18. The system of claim 13, wherein the view displaying program module further operates to install a new view control by:

a. identifying information to be shared between the new view control and the view displaying program module,
b. modifying the new view control allowing it to share the information to the view displaying program module,
c. defining the new view control to the view displaying program module.

\* \* \* \* \*